Dec. 17, 1957 E. STEIN 2,817,043
WAVEFORM MONITOR
Filed March 3, 1953
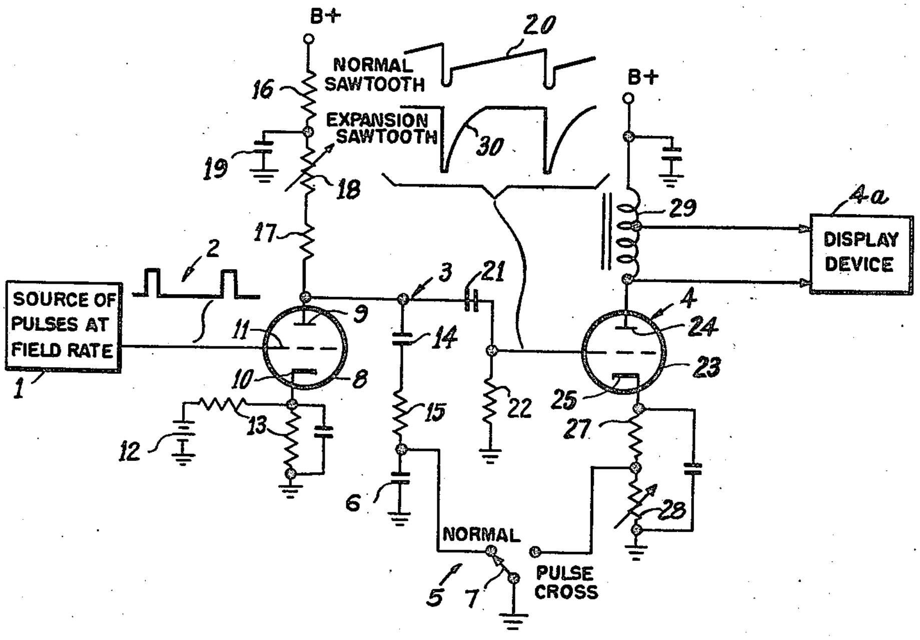
INVENTOR
EMANUEL STEIN
BY Percy P. Lantzy
ATTORNEY United States Patent Office 2,817,043

Patented Dec. 17, 1957

2,817,043

WAVEFORM MONITOR

Emanuel Stein, Fairlawn, N. J., assignor to International Telephone and Telegraph Corporation, a corporation of Maryland Application March 3, 1953, Serial No. 340,093

8 Claims. (Cl. 315—23)

This invention relates to waveform monitors and more particularly to means providing an expanded pulse-cross display in a television picture monitor.

It is of utmost importance for a television broadcast station to accurately monitor the relative phasing and duration of synchronizing information generated by the synchronizing generator for ultimate transmission in conjunction with the picture signal. The Federal Communications Commission (FCC) has established certain standards for this synchronizing information, such as required pulse-width limitations and phasing limitations of the various pulses, which must be complied with by the broadcaster. Therefore, the broadcaster must have available certain relative phasing and duration information relating to this transmitted synchronization to ascertain whether or not they are complying with the FCC standards.

The monitoring of the synchronizing information may be accomplished by employing the known expanded pulse-cross display technique wherein the vertical blanking interval is expanded so that the individual scanning lines therein are distinguishable from each other enabling the counting thereof. With the horizontal interval properly phased and maintained at the proper horizontal sweep speed and linearity, the horizontal scanning time will remain unaffected thereby enabling the direct measurement of various synchronizing pulse-widths providing a method of determining the portion of the total line period occupied by these pulses. The thus produced pulse-cross display will provide information as to possible defects present in the transmitted synchronizing signal, such as incorrect pulse-widths, phase distortion of pulses, and many other such useful pieces of information enabling the broadcaster to maintain the synchronizing signals within the operating limits as established by the FCC.

The pulse-cross pattern in the past has been derived by coupling any convenient 60 cycle voltage to the vertical oscillator causing synchronization thereof substantially at the peaks of the sine wave resulting in an appropriate vertical phasing. With this proper phasing being established, the expansion of the vertical interval may be accomplished by gross distortion of the vertical linearity. In a monitor employing a vertical feedback circuit for vertical linearization, this may be accomplished by shorting out the vertical feedback resistor. The accuracy and ease of observing the desired synchronizing information with the above means to produce a pulse-cross display depends for its accuracy to a great extent upon the frequency stability of the external source of 60 cycle voltage and the appropriate phasing between the vertical blanking interval. The use of such an arrangement could cause extreme difficulty in obtaining a steady pulse-cross display which inherently defeats the objective of a quick and accurate recognition of defects in television picture synchronizing information.

Therefore, it is an object of this invention to provide a means for obtaining the vertical expansion necessary for an accurate and steady pulse-cross presentation at the discretion of the operator by modification of the conventional vertical deflection circuit included in a given waveform monitor, wherein proper phasing of the video signal with respect to the deflection waveforms and video inversion for intensity modulation has been established.

A feature of this invention is the provision of a pulse-cross switching circuit incorporated in the vertical deflection system of a waveform monitor including means to change the time constant of the vertical sawtooth generator in a manner to produce a rapidly rising or expansion sawtooth waveform for expansion of the vertical blanking interval and means to alter the operating characteristics of the vertical output tube to accommodate said rapid waveform for appropriate coupling to an oscillographic display device for obtaining a pulse-cross presentation.

The above-mentioned and other features and objects of this invention will become more apparent by reference to the following description taken in conjunction with the accompanying drawing, the single figure of which illustrates schematically an embodiment of my invention.

In the drawing there is illustrated a portion of the vertical deflection circuitry comprising a source of pulses 1 wherein the output therefrom, as illustrated by curve 2, is repetitious at the field scanning rate for control of the operation of vertical sawtooth generator 3. Generator 3 includes therein an RC charging network having a specified time constant for development of a normal sawtooth shape waveform to aid in the production of conventional monitor waveforms on an oscillographic display device *4a*. The sawtooth voltage output from vertical sawtooth generator 3 is coupled to vertical output device 4 for appropriate coupling thereof to the vertical deflection yoke of an associated magnetic deflection display device *4a* for an appropriate sweeping action of the electron beam therein. It will be obvious that the vertical expansion deflection system herein described may be logically extended to control the type of display on an electrostatic type display device.

Since the pulse-cross display is not necessary at all times and most television monitors are employed to monitor other signals at specified points in the studio equipment in connection with the transmission of the television signal, it is necessary to provide a pulse-cross switching circuit 5 arranged in a manner whereby activation thereof from the "normal" position to the "pulse-cross" position causes an increase in the rapidity of the sawtooth voltage and therefore an expansion sawtooth waveform. Such an increase in the speed of the sawtooth voltage acts to expand the vertical blanking interval of the picture signal for occupation of approximately one-third of the normal picture area on the display device *4a*. This desirable deflection expansion is accomplished by inserting a small capacitor 6 in series with the usual RC charging network included in generator 3.

Source 1 may comprise any conventional time pulse generator for initiating the usual operation of sawtooth generator 3. Preferably, however, source 1 comprises a vertical synchronizing generator having a repetitious rate equivalent to the usual field scanning rate under control of the usual sync separator circuit and sync striper circuit incorporated in conventional monitors to remove the synchronizing signal from the composite viedo signal and to separate the vertical synchronizing signal from the total synchronizing signal, respectively. Vertical sawtooth generator 3 comprises essentially an electron discharge device 8 having at least an anode 9, a cathode 10, and a control grid 11, a biasing circuit associated with cathode 10 including fixed bias potential 12 and the resistor combination 13 to cooperate in establishing the operating condition of device 8, and an RC charging network including condenser 14 and resistors 15, 17 and 18 associated with anode 9 having a predetermined time constant for production of the necessary sawtooth voltage needed for presentation of the normal monitoring waveforms. The biasing circuit is such that device 8 is capable of conduction only during the presence of a pulse from source 1 and cooperating to provide a path for the discharge of condenser 14 of the RC charging network. The charging and discharging of condenser 14 produces the normal sawtooth voltage substantially as illustrated in curve 20. The charging of condenser 14 is controlled by a B+ source and the voltage divider arrangement including essentially resistors 15, 17, and the picture height control 18 properly decoupled and bypassed with respect to radio frequency by resistor 16 and condenser 19. The control 18 is adjustable for control of the voltage to which condenser 14 charges which alters the effective maximum voltage attained by the normal sawtooth waveform and therefore the picture height.

As hereinabove stated the time constant as essentially represented by condenser 14 and resistors 15, 17 and 18 is such that a normal sweep voltage is produced substantially as illustrated by curve 20 for coupling to vertical output circuit 4 by means of coupling condenser 21 and grid leak resistor 22. Vertical output circuit 4 includes an electron discharge device 23 having at least an anode 24, a cathode 25, and a control grid 26 wherein the conduction and operating characteristics thereof are substantially controlled with respect to the input voltage thereto by the voltage divider arrangement in the cathode circuit including resistor 27 and vertical linearity control 28. The conduction of device 23 in a manner dictated by the sawtooth waveform produced by generator 3 produces at anode 24 a sweep voltage having suitable vertical linearity, as adjusted by control 28, for coupling to the vertical deflection means of an appropriate display device *4a* through means of vertical output transformer 29.

As hereinabove indicated the time constant of the RC charging network in the anode circuit of device 8 is such that a normal display of television pictures and/or desired waveforms is obtained to provide for the usual monitoring techniques. When the synchronizing information being transmitted is to be monitored by the pulse-cross technique switch 7 is moved to the "pulse-cross" position. This operation performs a dual function of (1) unshorting condenser 6 in a manner to place it in series with the RC charging network associated with the anode circuit of device 8 and thereby decreasing the time constant thereof to increase the speed of rise time and thereby decrease the time duration of the normal sawtooth waveform developed by vertical sawtooth generator 3 to provide an expansion sawtooth waveform and (2) places a short about vertical linearity control 28 to change the operating condition of the electron discharge device 23 included in vertical output device 4 for undistorted accommodation of the expansion sawtooth waveform applied thereto from generator 3.

Therefore, the RC charging network in the anode circuit of device 8 is altered in a manner whereby the sawtooth waveform thus produced reaches its maximum excursion in a shorter period of time than the normal waveform as may be ascertained by comparing the expansion sawtooth waveform, curve 30, with the normal sawtooth waveform, curve 20. The addition of capacitor 6 in series with the normal charging capacitor 14 decreases the time constant of the RC charging network a predetermined amount sufficient to cause expansion of the vertical blanking interval for achievement of a desired pulse-cross display on the display device *4a*.

The operating characteristic of the vertical output tube 23 is altered when switch 7 is placed in the "pulse-cross" position by causing a portion of the cathode resistance to be shorted out. As shown, the resistance shorted out is resistor 28, the vertical linearity control. This reduction of cathode resistance causes the electron discharge device 23 to operate at a lower bias and to remain within its current operating range when accommodating the expansion sawtooth waveform of obviously larger amplitude than the normal sawtooth waveform for coupling to the vertical deflection means of a display device *4a* to cooperate in deriving during the vertical blanking interval a pulse-cross display.

While I have described above the principles of my invention in connection with specific apparatus, it is to be clearly understood that this description is made only by way of example and not as a limitation to the scope of my invention as set forth in the objects thereof and in the accompanying claims.

I claim:

1. In a television picture waveform monitor including a source of triggering pulses repetitious at the field scanning rate, a vertical sawtooth generator activated in accordance with said triggering pulses to produce normal vertical sweep waveforms, an oscillographic display device, an electron discharge device coupling the sweep waveform output of said generator to said display device, and a switching circuit controllably associated with said generator and said electron discharge device, said switching circuit providing an expansion vertical sweep waveform at the discretion of an operator capable of expanding the vertical blanking interval for achievement of a pulse-cross presentation on said display device.

2. In a monitor according to claim 1, wherein said switching circuit further provides a means for reduction of the operating bias voltage of said electron discharge device to accommodate said expansion sweep waveform.

3. In a television picture waveform monitor including a source of triggering pulses repetitious at the field scanning rate, a vertical sawtooth generator activated in accordance with said triggering pulses to produce normal vertical sweep waveforms, an oscillographic display device, an electron discharge device coupling the sweep waveform output of said generator to said display device, and a switching circuit controllably associated with said generator and said electron discharge device to provide an expansion vertical sweep waveform at the discretion of an operator capable of expanding the vertical blanking interval for achievement of a pulse-cross presentation on said display device, said switching circuit further providing a means for reduction of the operating bias voltage of said electron discharge device to accommodate said expansion sweep waveform, said reduction means including a shorting arrangement associated with the cathode circuit of said electron discharge device to reduce the resistance therein.

4. In a monitor according to claim 3, wherein said generator includes an RC charging network and said switching circuit includes a condenser and a single pole double throw switch, said switch being operable to insert said condenser in series with said RC charging network to provide a pulse-cross presentation.

5. In a monitor according to claim 4, wherein said switch inserts said condenser in association with said RC charging network to reduce the time constant thereof and simultaneously reduces by a predetermined amount the operating bias of said electron discharge device.

6. In a waveform monitor, a vertical deflection sweep circuit comprising a source of field scanning timing pulses, a vertical sawtooth generator associated with said source including an electron discharge device having at least an anode, a cathode, and a control grid biased to conduct during the presence of said timing pulses and an RC charging network associated with said anode for production of a normal vertical sweep waveform, an oscillographic display device, a vertical output electron discharge tube having at least an anode, a cathode, and a control grid to couple the output of said sawtooth generator to said display device, and a switching circuit controllably associated with said sawtooth generator and said output tube altering said RC charging network for production of an expansion sweep waveform and simultaneously change the operating condition of said output tube to present a pulse-cross presentation on said display device.

7. In a waveform monitor, a vertical deflection sweep circuit comprising a source of field scanning timing pulses, a vertical sawtooth generator associated with said source including an electron discharge device having at least an anode, a cathode and a control grid biased to conduct during the presence of said timing pulses and an RC charging network associated with said anode for production of a normal vertical sweep waveform, an oscillographic display device, a vertical output electron discharge tube having at least an anode, a cathode and a control grid to couple the output of said sawtooth generator to said display device, and a switching circuit controllably associated with said sawtooth generator and said output tube to alter said RC charging network for production of an expansion sweep waveform and to simultaneously change the operating condition of said output tube to present a pulse-cross presentation on said display device, said switching circuit including a condenser and a "normal-pulse-cross" switch, said switch being operable to insert said condenser in series with said RC charging network and simultaneously short out a portion of the resistance in the cathode circuit of said output tube upon movement of said switch to "pulse-cross" position.

8. In a monitor according to claim 7, wherein said condenser reduces the time constant of said RC charging network a predetermined amount for an increase in the rise time of said normal sweep waveform sufficiently for employment of pulse-cross monitoring techniques.

References Cited in the file of this patent

UNITED STATES PATENTS

| | | |
|---|---|---|
| 2,412,542 | Smith | Dec. 10, 1946 |
| 2,436,655 | Locke | Feb. 24, 1948 |
| 2,533,251 | Hill | Dec. 12, 1950 |